United States Patent
Oe et al.

(10) Patent No.: US 7,664,917 B2
(45) Date of Patent: Feb. 16, 2010

(54) DEVICE AND METHOD FOR CACHING CONTROL, AND COMPUTER PRODUCT

(75) Inventors: Kazuichi Oe, Kawasaki (JP); Takashi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 185 days.

(21) Appl. No.: 11/192,132

(22) Filed: Jul. 29, 2005

(65) Prior Publication Data

US 2006/0218349 A1 Sep. 28, 2006

(30) Foreign Application Priority Data

Mar. 24, 2005 (JP) ............................. 2005-086197

(51) Int. Cl.
G06F 12/00 (2006.01)
G06F 13/00 (2006.01)
G06F 13/28 (2006.01)

(52) U.S. Cl. ...................................................... 711/118
(58) Field of Classification Search .................. 711/118
See application file for complete search history.

(56) References Cited

U.S. PATENT DOCUMENTS

| | | | | |
|---|---|---|---|---|
| 5,577,226 | A * | 11/1996 | Percival | 711/119 |
| 6,615,322 | B2 * | 9/2003 | Arimilli et al. | 711/145 |
| 6,741,963 | B1 * | 5/2004 | Badt et al. | 704/270 |
| 6,925,546 | B2 * | 8/2005 | Krejsa | 711/173 |
| 7,124,169 | B2 | 10/2006 | Shimozono et al. | |
| 7,228,384 | B2 | 6/2007 | Mizuno | |
| 2002/0152357 | A1 * | 10/2002 | Takahashi et al. | 711/119 |
| 2005/0071599 | A1 * | 3/2005 | Modha et al. | 711/170 |
| 2005/0144380 | A1 * | 6/2005 | Suzuki et al. | 711/113 |
| 2006/0187908 | A1 | 8/2006 | Shimozono et al. | |

FOREIGN PATENT DOCUMENTS

| | | |
|---|---|---|
| JP | 05-225066 | 9/1993 |
| JP | 2001-125879 | 5/2001 |
| JP | 2001-209498 | 8/2001 |

(Continued)

OTHER PUBLICATIONS

Xubin He, Qing Yang, and Ming Zhang, "A Cahing Strategy to Improve iSCSI Performance," in Proc. of IEEE Annual Conference on Local Computer Networks, Nov. 6-8, 2002.*

Naotaka Aoki, "iSCSI: State-of-the-Art Technology Enabling Widespread Storage Application for IP Networks", http://www.atmarkit.co.jp/fnetwork/tokusyu/16iscsi01.html.

(Continued)

*Primary Examiner*—Matt Kim
*Assistant Examiner*—Ralph A Verderamo, III
(74) *Attorney, Agent, or Firm*—Staas & Halsey LLP

(57) ABSTRACT

A caching control device that controls caching of data stored in a storage device, includes a storing unit that stores information concerning memory allocated to the storage device as its cache memory, where the storing unit is installed in a first computer connected to a second computer via a network, and the second computer manages reading and writing of data to the storage device; and a controller that controls the caching of the data that uses a memory installed in the first computer as cache memory, based on the information stored in the storing unit.

9 Claims, 12 Drawing Sheets

FOREIGN PATENT DOCUMENTS

| | | |
|---|---|---|
| JP | 2001-2090498 | 8/2001 |
| JP | 2002-132455 | 5/2002 |
| JP | 2004-342071 | 12/2004 |
| JP | 2005-010969 | 1/2005 |
| JP | 2005-122602 | 5/2005 |
| JP | 2006-516341 | 6/2006 |
| WO | 2004/068469 A2 | 8/2004 |
| WO | 2004/068469 A3 | 8/2004 |

OTHER PUBLICATIONS

Japanese Office action mailed Jan. 6, 2009 in corresponding Japanese Application No. 2005-086197 issued Dec. 24, 2008 (2 pages plus 3 pages English Translation).

Japanese Decision of a Patent Grant mailed Jun. 16, 2009 issued in corresponding Japanese Application 2005-086197, 3 pages (English translation 4 pages).

* cited by examiner

DEVICE AND METHOD FOR CACHING CONTROL, AND COMPUTER PRODUCT

BACKGROUND OF THE INVENTION

1. Field of the Invention

The present invention relates to a device and method for caching control, and a computer product that allocate a cache memory appropriately to a storage device, and execute data caching efficiently.

2. Description of the Related Art

A small computer systems interface (SCSI) command used between a storage device such as a hard disk device and a computer is transmitted via the Internet Protocol (IP) network, thereby enabling plural computers to access the storage device connected to the IP network. This technique, known as small computer systems interface over IP (iSCSI), has recently become popular.

Specifically, according to the iSCSI technique, the computer can access the storage device via the IP network by transmitting the SCSI command encapsulated in a transmission frame of the Transmission Control Protocol/Internet Protocol (TCP/IP) packet.

Based on the above arrangement, an application program that uses the storage device can access the storage device according to the conventional method, via the IP network for high-speed communications, without recognizing the existence of the iSCSI (see, "Latest IP storage technology 'iSCSI'" Naotaka AOKI, [online], Oct. 5, 2002, ITmedia, [searched on Mar. 7, 2005], Internet <URL: http://www.atmarkit.co.jp/fnetwork/tokusyuu/16iscsi/iscsi01.html>).

According to the above conventional technique, when the application program uses the storage device, a memory of the computer that manages the storage device is allocated to the storage device as a cache memory. However, it is difficult to appropriately allocate the capacity of the cache memory.

For example, when the cache memory is allocated to the storage device to meet maximum access to the storage device by the application program, the allocated cache memory is not used when the application program is not using the storage device, and this is a waste of memory.

Particularly, when a time zone during which the access from an application program to the storage device is concentrated is different for each application program, it becomes more difficult to appropriately allocate the capacity of the cache memory.

Therefore, the way of appropriately allocating the cache memory to the storage device and the way of efficiently caching data stored in the storage device are important.

SUMMARY OF THE INVENTION

It is an object of the present invention to at least solve the problems in the conventional technology.

According to one aspect of the present invention, a caching control device that controls caching of data stored in a storage device, includes a storing unit that stores information concerning memory allocated to the storage device as its cache memory, the storing unit being installed in a first computer connected to a second computer via a network, and the second computer managing reading and writing of data to the storage device; and a controller that controls the caching of the data that uses a memory installed in the first computer as cache memory, based on the information stored in the storing unit.

According to another aspect of the present invention, a method to control caching of data stored in a storage device, includes storing, in a storing unit, information concerning memory allocated to the storage device as its cache memory, the storing unit being installed in a first computer connected to a second computer via a network, and the second computer managing reading and writing of data to the storage device; and controlling the caching of the data that uses a memory installed in the first computer as cache memory, based on the information stored.

According to still another aspect of the present invention, a computer-readable recording medium records therein a computer program including instructions, which when executed, cause the computer to execute the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings.

Figure 1:
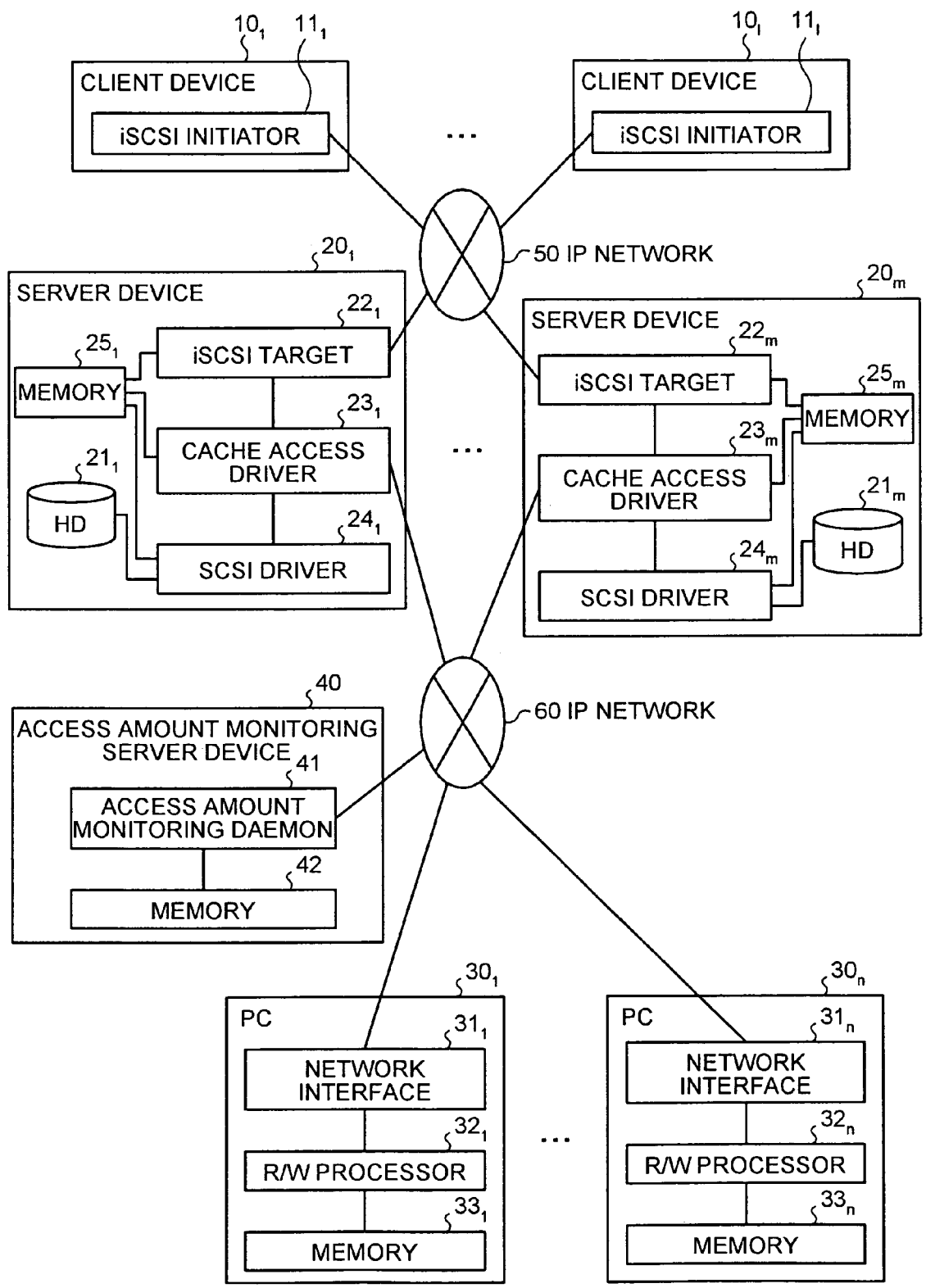
FIG. 1 is a configuration diagram of a caching control system according to the present invention.

A configuration of a caching control system according to the present invention is explained first with reference to FIG. 1.

As shown in FIG. 1, the caching control system includes client devices $10_1$ to $10_l$, server devices $20_1$ to $20_m$, personal computers (PCs) $30_1$ to $30_n$, and an access amount monitoring server device 40.

The client devices $10_1$ to $10_l$ transmit a SCSI command to hard disks (HDs) $21_1$ to $21_m$ provided in the server devices $20_1$ to $20_m$ via an IP network 50, and read and write data, using the iSCSI technique.

The server devices $20_1$ to $20_m$ receive the SCSI command transmitted from the client devices $10_1$ to $10_l$ respectively, and execute a data read and write process to the HDs $21_1$ to $21_m$ requested by the client devices $10_1$ to $10_l$.

The PCs $30_1$ to $30_n$ include memories $33_1$ to $33_n$ such as random access memories (RAMs) installed therein, and are connected to the server devices $20_1$ to $20_m$ via an IP network 60.

According to the caching control system, the memories $33_1$ to $33_n$ installed in the PCs $30_1$ to $30_n$ are allocated to the HDs $21_1$ to $21_m$ of the server devices $20_1$ to $20_m$ as cache memories as necessary.

Based on this arrangement, the server devices $20_1$ to $20_m$ do not always need to prepare cache memories of necessary capacity in the server devices $20_1$ to $20_m$. Therefore, the capacity of the cache memory can be flexibly changed.

The access amount monitoring server device 40 receives a request for allocating cache memories to the HDs $21_1$ to $21_m$ from the server devices $20_1$ to $20_m$, and allocates the cache memories.

A functional configuration of each device is explained in detail next. The client devices $10_1$ to $10_l$ include iSCSI initiators $11_1$ to $11_l$. When an application program transmits a SCSI command to the HDs, $21_1$ to $21_m$ of the server devices $20_1$ to $20_m$ via the IP network 50, the iSCSI initiators $11_1$ to $11_l$ transmit the SCSI command encapsulated in a transmission frame of the TCP/IP packet.

The server devices $20_1$ to $20_m$ include the HDs $21_1$ to $21_m$, iSCSI targets $22_1$ to $22_m$, cache access drivers $23_1$ to $23_m$, SCSI drivers $24_1$ to $24_m$, and memories $25_1$ to $25_m$.

The HDs $21_1$ to $21_m$ store and read data. When the client devices $10_1$ to $10_l$ transmit the SCSI command encapsulated in the transmission frame of the TCP/IP packet, the iSCSI targets $22_1$ to $22_m$ restore the SCSI command, and transfer the restored SCSI command to the SCSI drivers $24_1$ to $24_m$.

When the memories $33_1$ to $33_n$ of the PCs $30_1$ to $30_n$ are allocated as cache memories of the HDs $21_1$ to $21_m$, the cache access drivers $23_1$ to $23_m$ execute data caching of the HDs $21_1$ to $21_m$ that use the memories $33_1$ to $33_n$ as cache memories.

The cache access drivers $23_1$ to $23_m$ monitor a state of data cache such as a cache mishit rate in the data caching and the amount of data transferred to the HDs $21_1$ to $21_m$, and store the information into the memories $25_1$ to $25_m$ of the server devices $20_1$ to $20_m$.

When the cache hit rate is low and when it is determined that the capacity of the cache memories allocated to the HDs $21_1$ to $21_m$ is less, the cache access drivers $23_1$ to $23_m$ request the access amount monitoring server device 40 to allocate the memories $33_1$ to $33_n$ installed in the PCs $30_1$ to $30_n$ as cache memories of the HDs $21_1$ to $21_m$ and to increase the capacity of the cache memories.

The SCSI drivers $24_1$ to $24_m$ receive the SCSI command transmitted from the client devices $10_1$ to $10_l$, and execute the data read and write to the HDs $21_1$ to $21_m$.

The memories $25_1$ to $25_m$ are storage devices into which the iSCSI targets $22_1$ to $22_m$, the cache access drivers $23_1$ to $23_m$, and the SCSI drivers $24_1$ to $24_m$ store various kinds of data. Information stored in the memories $33_1$ to $33_n$ of the PCs $30_1$ to $30_n$ that are currently allocated to the HDs $21_1$ to $21_m$ as cache memories, and information such as a state of data caches such as a cache hit rate are stored in these memories $25_1$ to $25_m$.

The PCs $30_1$ to $30_n$ include network interfaces $31_1$ to $31_n$, R/W (read and write) processors $32_1$ to $32_n$, and the memories $33_1$ to $33_n$.

The network interfaces $31_1$ to $31_n$ exchange data with the server devices $20_1$ to $20_m$ via the IP network 60.

The R/W processors $32_1$ to $32_n$ execute the data read and write to the memories $33_1$ to $33_n$. The memories $33_1$ to $33_n$ are storage devices such as a RAM, and are used as cache memories of the HDs $21_1$ to $21_m$ installed in the server devices $20_1$ to $20_m$.

The access amount monitoring server device 40 includes an access amount monitoring daemon 41, and a memory 42. The access amount monitoring daemon 41 receives a request from the server devices $20_1$ to $20_m$ for allocating cache memories to the HDs $21_1$ to $21_m$, and allocates the cache memories.

The memory capacity to be allocated as cache memory can be set in advance. Alternatively, the amount of data transfer to the HDs $21_1$ to $21_m$ can be inquired from the server devices $20_1$ to $20_m$, and the memory capacity to be allocated to the HDs $21_1$ to $21_m$ can be determined based on the size of the data transfer amount.

The access amount monitoring daemon 41 stores various kinds of data into the memory 42. Information collected from the cache access drivers $23_1$ to $23_m$ of the server devices $20_1$ to $20_m$ is also stored in the memory 42.

Figure 2:
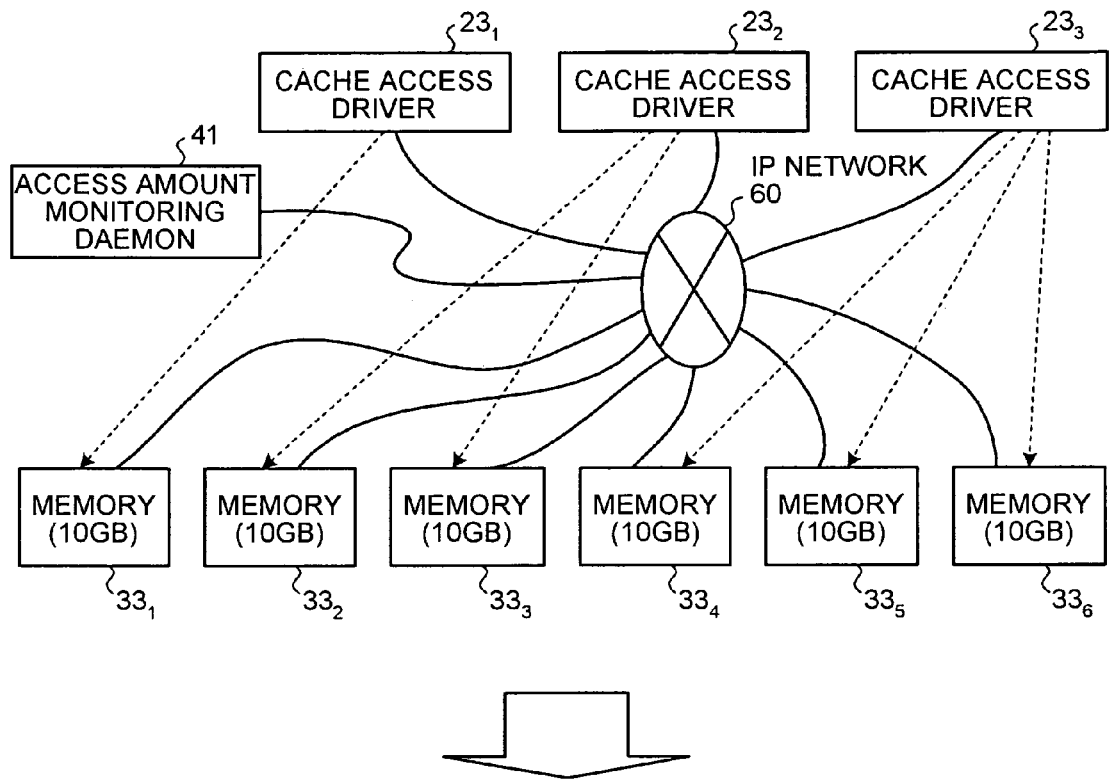
FIG. 2 is a diagram for explaining a concept of a caching control process according to a first embodiment.
Figure 2:
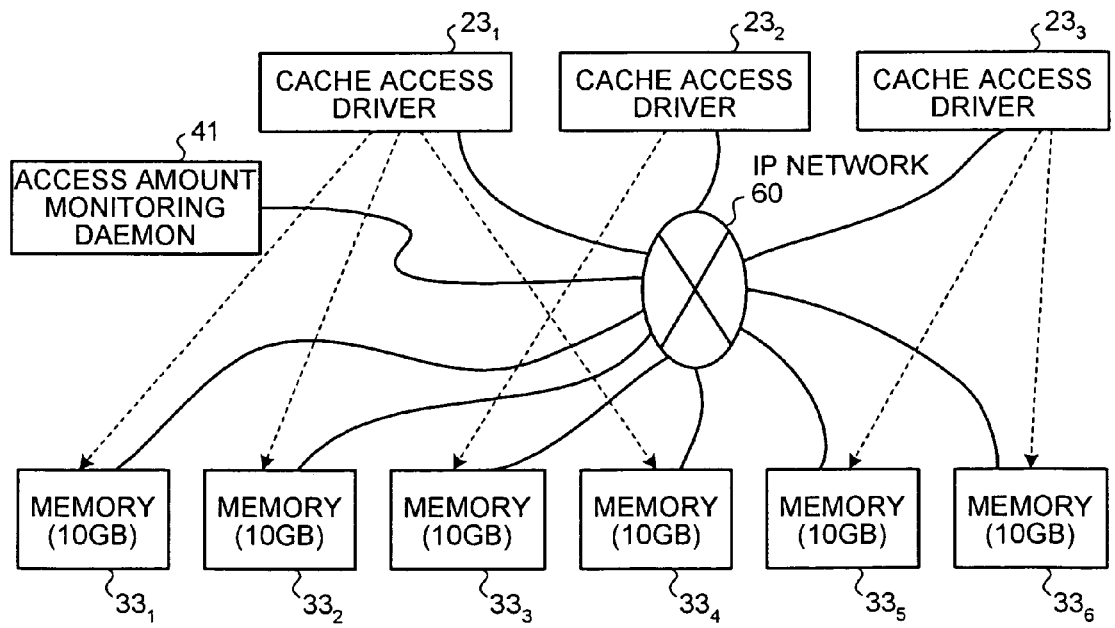
Figure 3:
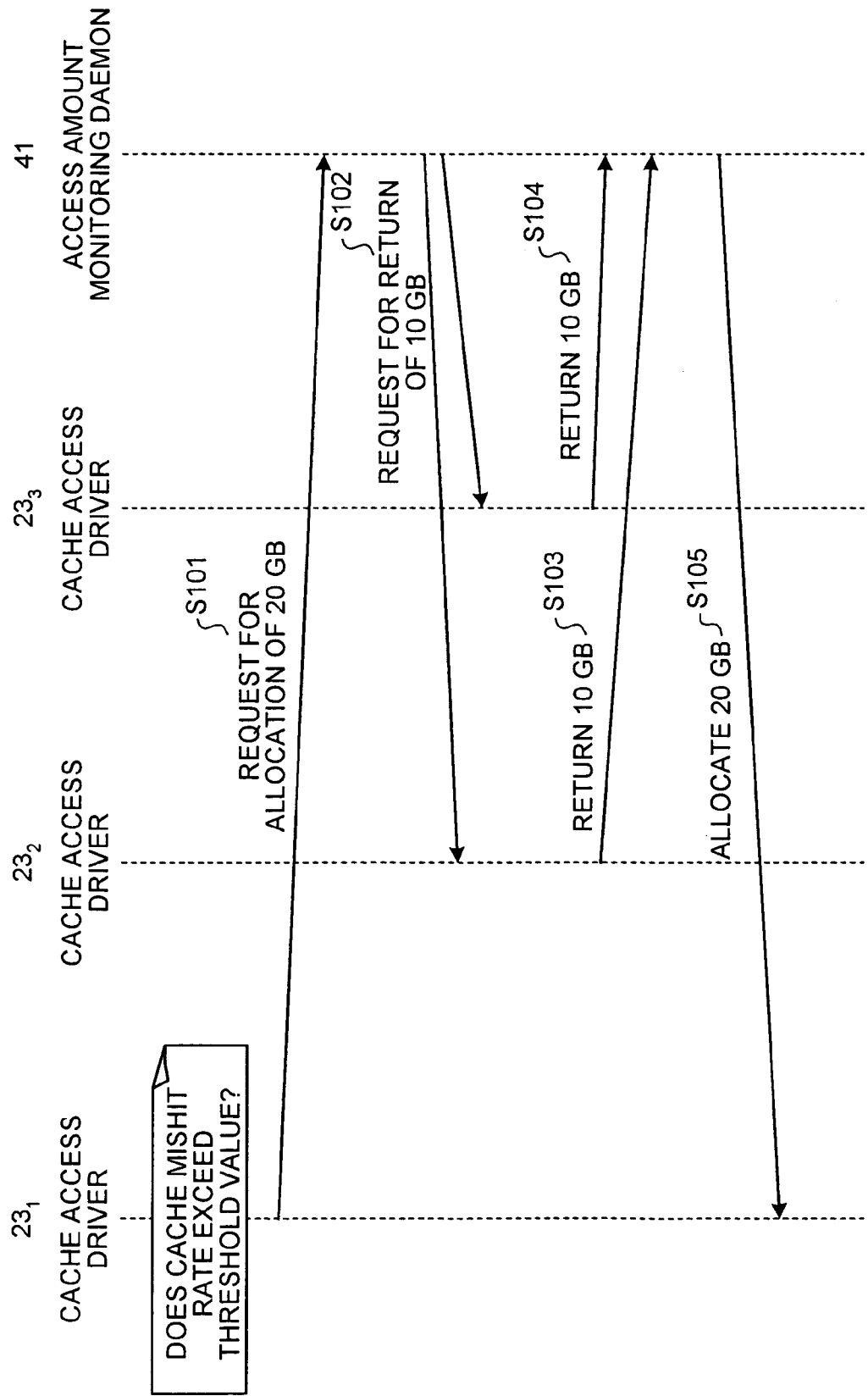
FIG. 3 is a sequence diagram of a process procedure of the caching control process according to the first embodiment.

A process procedure of a caching control process according to the first embodiment is explained next. FIG. 2 is a diagram for explaining a concept of the caching control process according to the first embodiment. FIG. 3 is a sequence diagram of a process procedure of the caching control process according to the first embodiment.

In FIG. 2, cache access drivers $23_1$ to $23_3$ provided in three server devices use memories $33_1$ to $33_6$ provided in six PCs $30_1$ to $30_6$ as cache memories via the IP network 60. Each of the memories $33_1$ to $33_6$ used as cache memories has a capacity of 10 gigabytes (GB).

The access amount monitoring daemon 41 in the access amount monitoring server device 40 shown in FIG. 1 is connected to the IP network 60.

In the initial state, the memory $33_1$ is allocated as a cache memory to the HD that is managed by the cache access driver $23_1$. The memories $33_2$ and $33_3$ are allocated as cache memories to the HD that is managed by the cache access driver $23_2$. The memories $33_4$, $33_5$, and $33_6$ are allocated as cache memories to the HD that is managed by the cache access driver $23_3$.

In this state, when the cache access driver $23_1$ detects that the cache mishit rate of data caching exceeds a predetermined threshold value, the cache access driver $23_1$ requests the access amount monitoring daemon 41 to allocate more cache memory (20 GB) as shown in FIG. 3 (step S101).

While the allocation amount is set as 20 GB in the present embodiment, this value can be set in advance. Alternatively, a suitable allocation value can be set by taking statistics of a relationship between the cache mishit rate and the allocation amount.

The access amount monitoring daemon 41 requests the cache access drivers $23_2$ and $23_3$ to return 10 GB of cache memory respectively (step S102).

In response to the request from the access amount monitoring daemon 41, the cache access drivers $23_2$ and $23_3$ return the 10 GB memories $33_2$ and $33_4$ managed by the cache access drivers $23_2$ and $23_3$ respectively (step S103, and step S104).

Thereafter, the access amount monitoring daemon 41 allocates the returned memories $33_2$ and $33_4$ of a total capacity of 20 GB to the HD managed by the cache access driver $23_1$ (step S105), and ends this caching control process.

FIG. 2 depicts a state after the memories $33_2$ and $33_4$ are allocated as cache memories. In other words, the memories $33_1$, $33_2$, and $33_4$ are allocated as cache memories to the HD that is managed by the cache access driver $23_1$. The memory $33_3$ is allocated as a cache memory to the HD that is managed by the cache access driver $23_2$. The memories $33_5$ and $33_6$ are allocated as cache memories to the HD that is managed by the cache access driver $23_3$.

As described above, according to the first embodiment, the memories $25_1$ to $25_m$ of the server devices $20_1$ to $20_m$ are installed in the PCs $30_1$ to $30_n$ connected via the IP network 60 to the server devices $20_1$ to $20_m$ that manage the reading and writing of data to the HDs $21_1$ to $21_m$. The information concerning the memories $33_1$ to $33_n$ allocated as cache memories of the HDs $21_1$ to $21_m$ are stored into these memories $25_1$ to $25_m$. The cache access drivers $23_1$ to $23_m$ execute the data caching using the memories $33_1$ to $33_n$ installed in the PCs $30_1$ to $30_n$ as cache memories, based on the information stored in the memories $25_1$ to $25_m$. Therefore, the cache memories can be appropriately allocated to the HDs $21_1$ to $21_m$, and the data can be cached efficiently.

In the above first embodiment, cache memories are allocated to the HDs $21_1$ to $21_m$ based on the cache mishit rate, thereby executing a data cache. It is also possible to determine data to be stored into the cache memories out of the data stored in the HDs $21_1$ to $21_m$, based on the amount of data transferred during a constant period.

An example of determining the data to be stored into the cache memories based on the amount of data transferred during a constant period is explained in a second embodiment.

Figure 4:
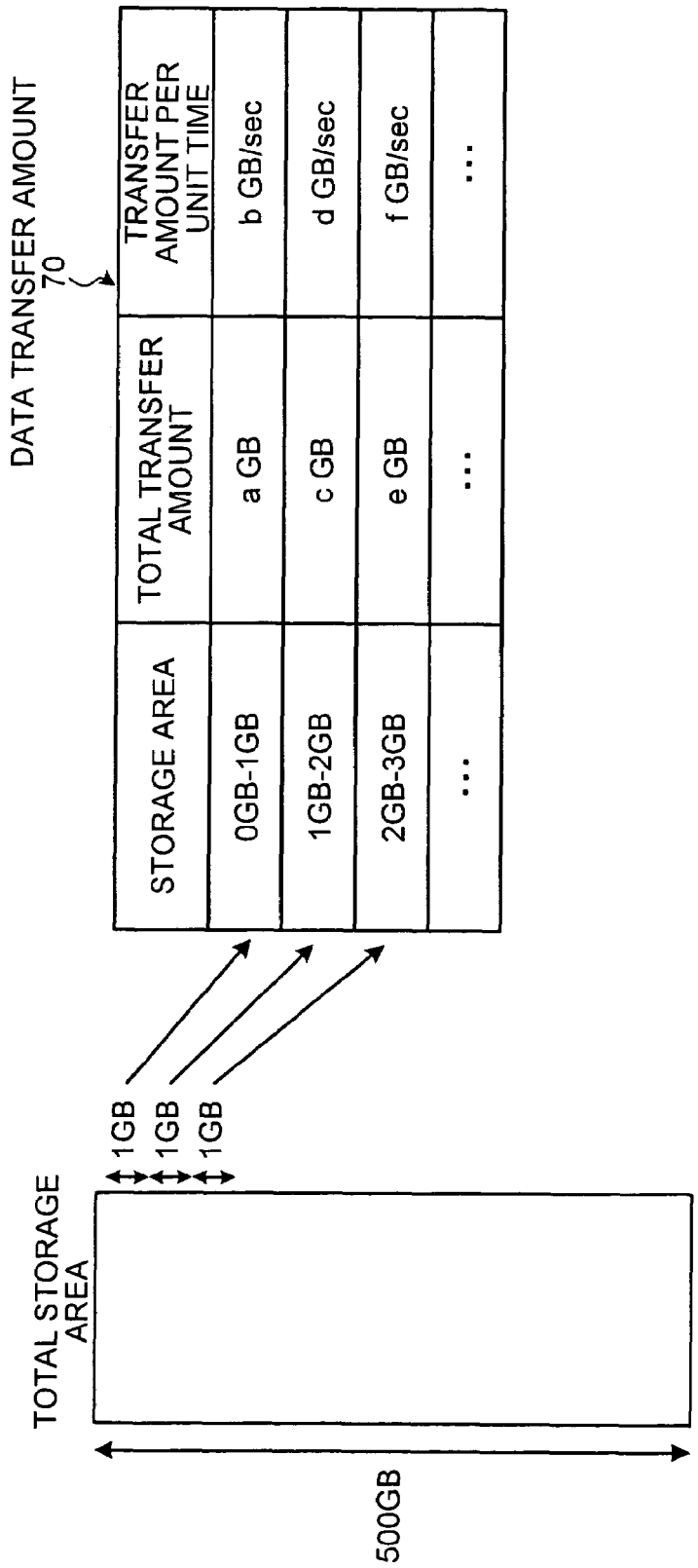
FIG. 4 is a diagram for explaining a caching control process according to a second embodiment.

FIG. 4 is a diagram for explaining a caching control process according to the second embodiment. In the caching control process, the cache access drivers $23_1$ to $23_m$ of the server devices $20_1$ to $20_m$ shown in FIG. 2 monitor the amount of data transferred to the HDs $21_1$ to $21_m$, and store the information of the amount of data transfer into the memories $25_1$ to $25_m$ of the server devices $20_1$ to $20_m$ as data transfer amount 70.

As shown in FIG. 4, the data transfer amount 70 stores a storage area, a total transfer amount, and a transfer amount per unit time. The storage area is a segmentation each of 1 GB of a storage area of the HDs $21_1$ to $21_m$ (in this example, the storage area of the HDs $21_1$ to $21_m$ is assumed to have a capacity of 500 GB).

The total transfer amount is a total amount of data transferred during a constant period, such as one week, for example. The transfer amount per unit time is a transfer amount of data per unit time calculated based on a transfer amount of data during a period shorter than the total transfer amount, such as 1 minute, for example.

In the caching control process, one threshold value each is set for the total transfer amount and the transfer amount per unit time. When the total transfer amount exceeds the threshold value, or when the transfer amount per unit time exceeds the threshold value, the cache access drivers $23_1$ to $23_m$ store data of that storage area in which the threshold value is exceeded, into the cache memories.

When the total transfer amount is smaller than the threshold value and also when the transfer amount per unit time is smaller than the threshold value, the cache access drivers $23_1$ to $23_m$ delete data of that storage area in which the transfer amounts are smaller than the threshold values, from the cache memories.

Figure 5:
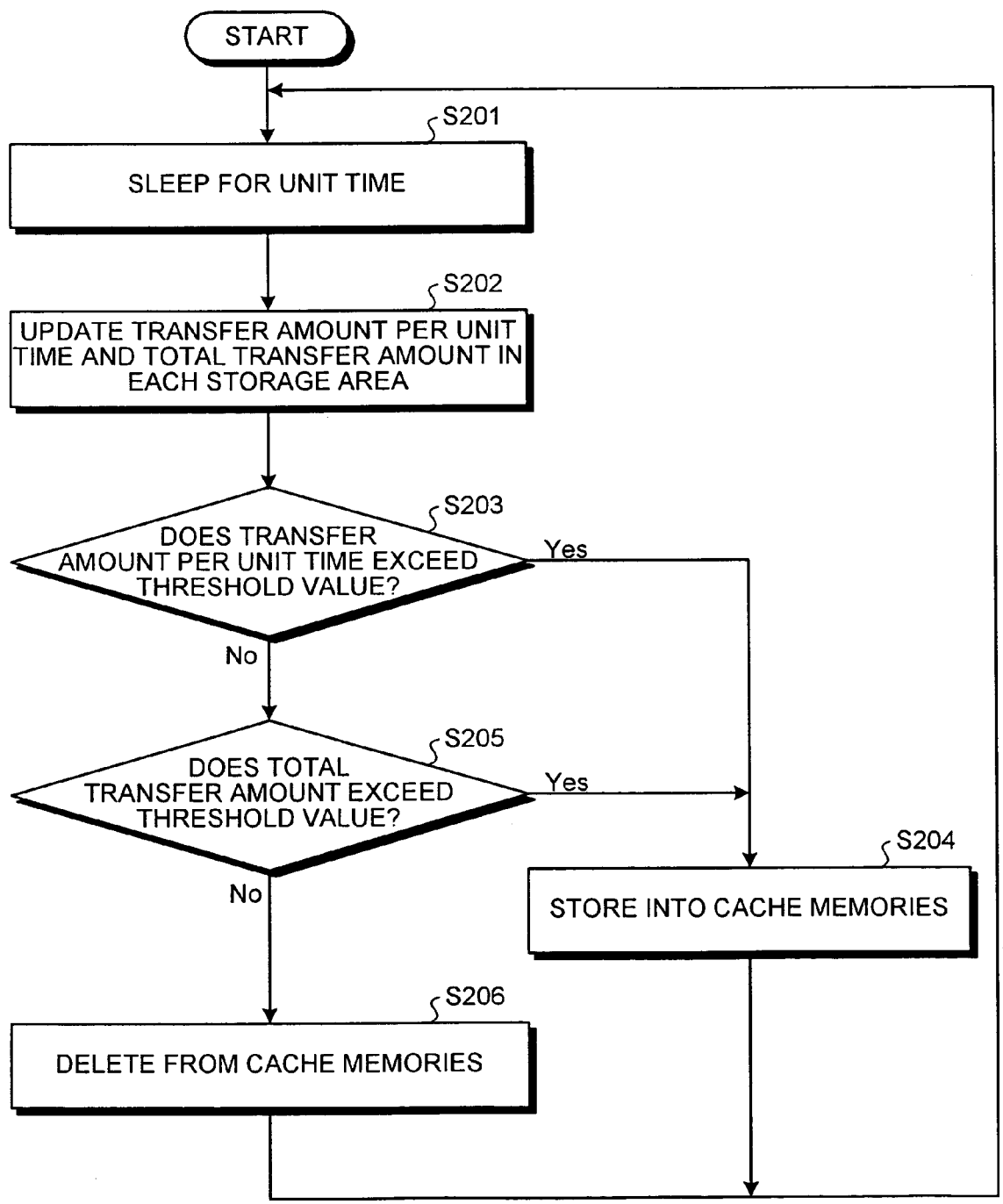
FIG. 5 is a flowchart of a process procedure of the caching control process according to the second embodiment.

A process procedure of the caching control process according to the second embodiment is explained next. FIG. 5 is a flowchart of the process procedure of the caching control process according to the second embodiment.

As shown in FIG. 5, the cache access drivers $23_1$ to $23_m$ of the server devices $20_1$ to $20_m$ sleep and wait for a unit time (step S201). The cache access drivers $23_1$ to $23_m$ update the transfer amount per unit time and the total transfer amount in each storage area in the data transfer amount 70 (step S202).

The cache access drivers $23_1$ to $23_m$ check whether the transfer amount per unit time exceeds the threshold value (step S203). If the transfer amount per unit time exceeds the threshold value (Yes at step S203), the cache access drivers $23_1$ to $23_m$ store the data of the storage area in which the threshold value is exceeded, into the cache memories (step S204), and the process returns to step S201.

If the transfer amount per unit time does not exceed the threshold value (No at step S203), the cache access drivers $23_1$ to $23_m$ check whether the total transfer amount exceeds the threshold value (step S205). If the total transfer amount exceeds the threshold value (Yes at step S205), the process proceeds to step S204. The cache access drivers $23_1$ to $23_m$ store the data of the storage area in which the threshold value is exceeded in the cache memory, and continue the subsequent process.

If the total transfer amount does not exceed the threshold value (No at step S205), the cache access drivers $23_1$ to $23_m$ delete the data of the storage area stored in the cache memory for which the threshold value is not exceeded, from the cache memories (step S206). The process returns to step S201.

As described above, according to the second embodiment, the cache access drivers $23_1$ to $23_m$ determine the state of access to the data stored in the HDs $21_1$ to $21_m$. Based on a result of the determination, the cache access drivers $23_1$ to $23_m$ determine whether the data is to be stored into the memories $33_1$ to $33_n$ installed in the PCs $30_1$ to $30_n$. Therefore, the cache access drivers $23_1$ to $23_m$ can determine whether the data should be stored into the cache memories according to the data access state. Consequently, the data caching process can be executed efficiently.

According to the second embodiment, the cache access drivers $23_1$ to $23_m$ determine whether the amount of data transferred to the HDs $21_1$ to $21_m$ during a predetermined time is larger than the predetermined threshold value. When the cache access drivers $23_1$ to $23_m$ determine that the amount of data transferred to the HDs $21_1$ to $21_m$ during a predetermined time is larger than the predetermined threshold value, the data is stored into the memories $33_1$ to $33_n$ installed in the PCs $30_1$ to $30_n$. Therefore, when the amount of data transferred to the HDs $21_1$ to $21_m$ during a predetermined time is larger than the threshold value, data to be transmitted by a large amount can be stored into the cache memories. Consequently, the caching process can be executed efficiently.

According to the second embodiment, when the cache access drivers $23_1$ to $23_m$ determine that the amount of data transferred during a predetermined time is smaller than the predetermined threshold value, the data stored in the memories $33_1$ to $33_n$ installed in the PCs $30_1$ to $30_n$ are deleted. Therefore, when the amount of data transferred to the HDs $21_1$ to $21_m$ during a predetermined time is smaller than the threshold value, data that is not transferred so often can be deleted from the cache memories. Consequently, the caching process can be executed efficiently.

According to the second embodiment, the cache access drivers $23_1$ to $23_m$ determine whether two amounts of data transferred during mutually different times are larger than predetermined threshold values. If at least one amount of data out of the two amounts of data transferred during mutually different times is larger than the predetermined threshold value, the data are stored into the memories $33_1$ to $33_n$ installed in the PCs $30_1$ to $30_n$. Therefore, data that is transferred by a large amount during a long period and data that is transferred by a large amount during a short period can be stored into the cache memories. Consequently, the caching process can be executed efficiently.

According to the second embodiment, the cache access drivers $23_1$ to $23_m$ determine whether two amounts of data transferred during mutually different times are larger than predetermined threshold values. If all amounts of data transferred during mutually different times are smaller than a predetermined threshold value, the data stored in the memories $33_1$ to $33_n$ installed in the PCs $30_1$ to $30_n$ are deleted. Therefore, data that is transferred by a small amount during a long period and during a short period can be determined and deleted from the cache memories. Consequently, the caching process can be executed efficiently.

In the first embodiment, the cache memories are allocated in response to the request of the cache access drivers $23_1$ to $23_m$ for the allocation of cache memories. It is also possible to set in advance, priority of allocation of cache memories to the HDs $21_1$ to $21_m$ managed by the cache access drivers $23_1$ to $23_m$ and a minimum capacity of the cache memories. Then, the cache memories can be allocated based on the priorities and the minimum capacity.

In a third embodiment, the operation of setting in advance, priorities (corresponding to weights) of allocation of cache memories to the HDs $21_1$ to $21_m$ managed by the cache access drivers $23_1$ to $23_m$ and a minimum capacity of the cache memories is explained.

Figure 6:
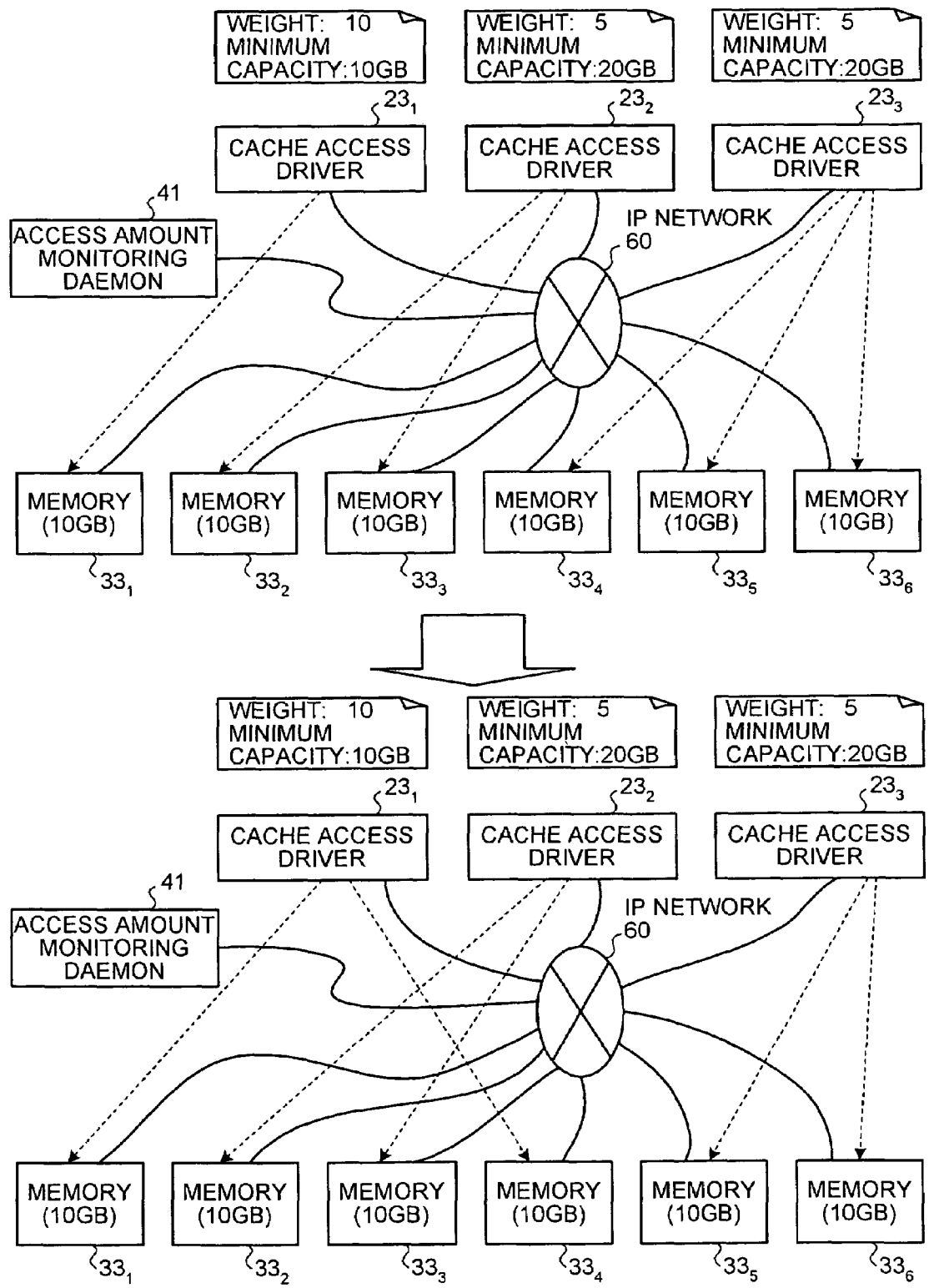
FIG. 6 is a diagram for explaining a concept of a caching control process according to a third embodiment.
Figure 7:
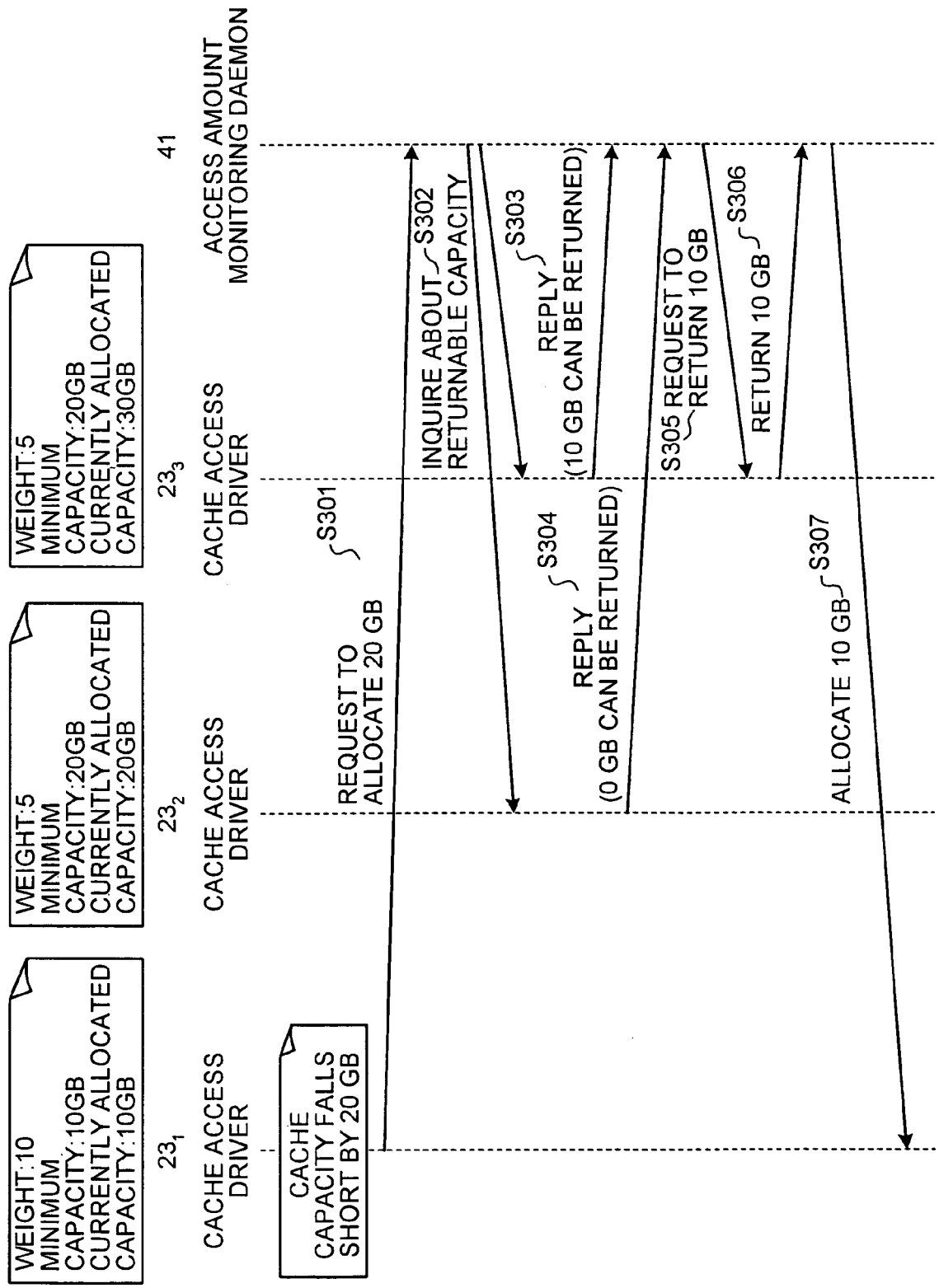
FIG. 7 is a sequence diagram of a process procedure of the caching control process according to the third embodiment.

A process procedure of a caching control process according to the third embodiment is explained below. FIG. 6 is a diagram for explaining a concept of the caching control process according to the third embodiment, and FIG. 7 is a sequence diagram of the process procedure of the caching control process according to the third embodiment.

In FIG. 6, the cache access drivers $23_1$ to $23_3$ provided in three server devices use the memories $33_1$ to $33_6$ in the six PCs $30_1$ to $30_6$ as cache memories via the IP network 60. Each of the memories $33_1$ to $33_6$ used as cache memories has a capacity of 10 GB.

The access amount monitoring daemon 41 included in the access amount monitoring server device 40 is connected to the IP network 60.

In the initial state, the memory $33_1$ is allocated as a cache memory to the HD managed by the cache access driver $23_1$. The memories $33_2$ and $33_3$ are allocated as cache memories to the HD managed by the cache access driver $23_2$. The memories $33_4$, $33_5$, and $33_6$ are allocated as cache memories to the HD managed by the cache access driver $23_3$.

In this state, when the cache access driver $23_1$ determines that the cache memory falls short by 20 GB, the cache access driver $23_1$ requests the access amount monitoring daemon 41 to allocate a cache memory of 20 GB as shown in FIG. 7 (step S301).

While the cache memory capacity requested for is set as 20 GB in the present embodiment, this value is determined from a difference between the capacity of data stored in the cache memory obtained based on the method explained in the second embodiment and the capacity of a cache memory already allocated.

The access amount monitoring daemon 41 inquires the cache access drivers $23_2$ and $23_3$ about memory that can be returned (step S302). In response to this inquiry, the cache access drivers $23_2$ and $23_3$ notify the returnable capacity of the cache memory to the access amount monitoring daemon 41 (step S303, and step S304).

In this case, a weight allocated to the HD managed by the cache access driver $23_1$ is 10, and weights allocated to the HDs managed by the cache access drivers $23_2$ and $23_3$ are 5 and 5, respectively. Because the weight allocated to the HDs managed by the cache access drivers $23_2$ and $23_3$ respectively is smaller than the weight allocated to the HD managed by the cache access driver $23_1$, the access amount monitoring daemon 41 can make the cache access drivers $23_2$ and $23_3$ release the cache memories.

On the other hand, if the weight allocated to the HDs managed by the cache access drivers $23_2$ and $23_3$ respectively is larger than the weight allocated to the HD managed by the cache access driver $23_1$, the access amount monitoring daemon 41 cannot make the cache access drivers $23_2$ and $23_3$ release the cache memories. In such case, the cache memory allocation request made by the cache access driver $23_1$ is refused.

Minimum allocation capacities of the cache memories of the HDs managed by the cache access drivers $23_2$ and $23_3$ are 20 GB and 20 GB, respectively. Currently allocated capacities of the cache memories of the HDs managed by the cache access drivers $23_2$ and $23_3$ are 20 GB and 30 GB, respectively. Therefore, the cache access driver $23_2$ cannot return the memories $33_2$ and $33_3$, but the cache access driver $23_3$ can return only the memory $33_4$ of 10 GB.

Thereafter, the access amount monitoring daemon 41 requests the cache access driver $23_3$ to return the memory $33_4$ of the returnable capacity (10 GB) (step S305).

In response to the request from the access amount monitoring daemon 41, the cache access driver $23_3$ returns the memory $33_4$ of the returnable capacity (10 GB) managed by the cache access driver $23_3$ (step S306).

The access amount monitoring daemon 41 allocates the returned memory $33_4$ of 10 GB to the HD managed by the cache access driver $23_1$ (step S307), and ends this caching control process.

FIG. 6 depicts a state after the memory $33_4$ is allocated as a cache memory. In other words, the memories $33_1$ and $33_4$ are allocated as cache memories to the HD managed by the cache access driver $23_1$. The memories $33_2$ and $33_3$ are allocated as cache memories to the HD managed by the cache access driver $23_2$. The memories $33_5$ and $33_6$ are allocated as cache memories to the HD managed by the cache access driver $23_3$.

Figure 8:
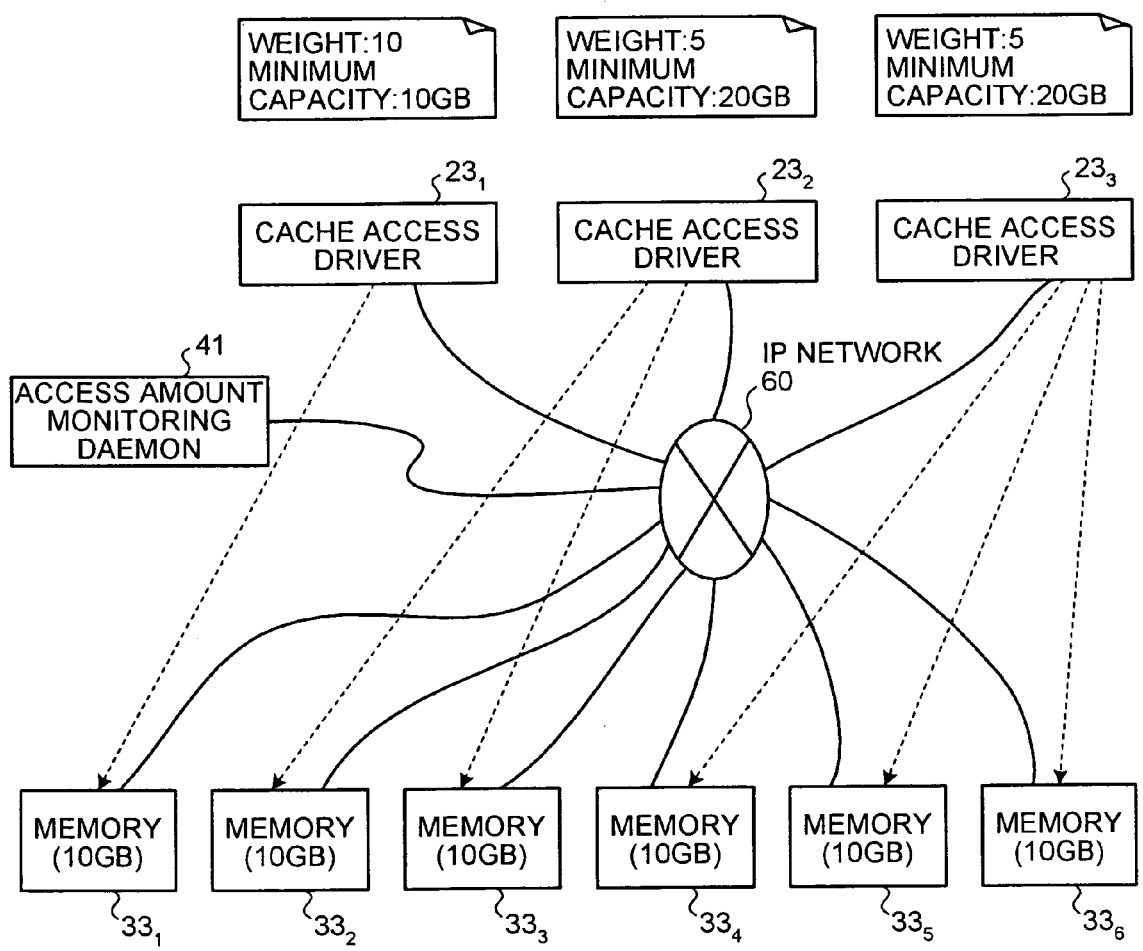
FIG. 8 is a diagram for explaining a concept of refusing a cache memory allocation request in the caching control process.
Figure 9:
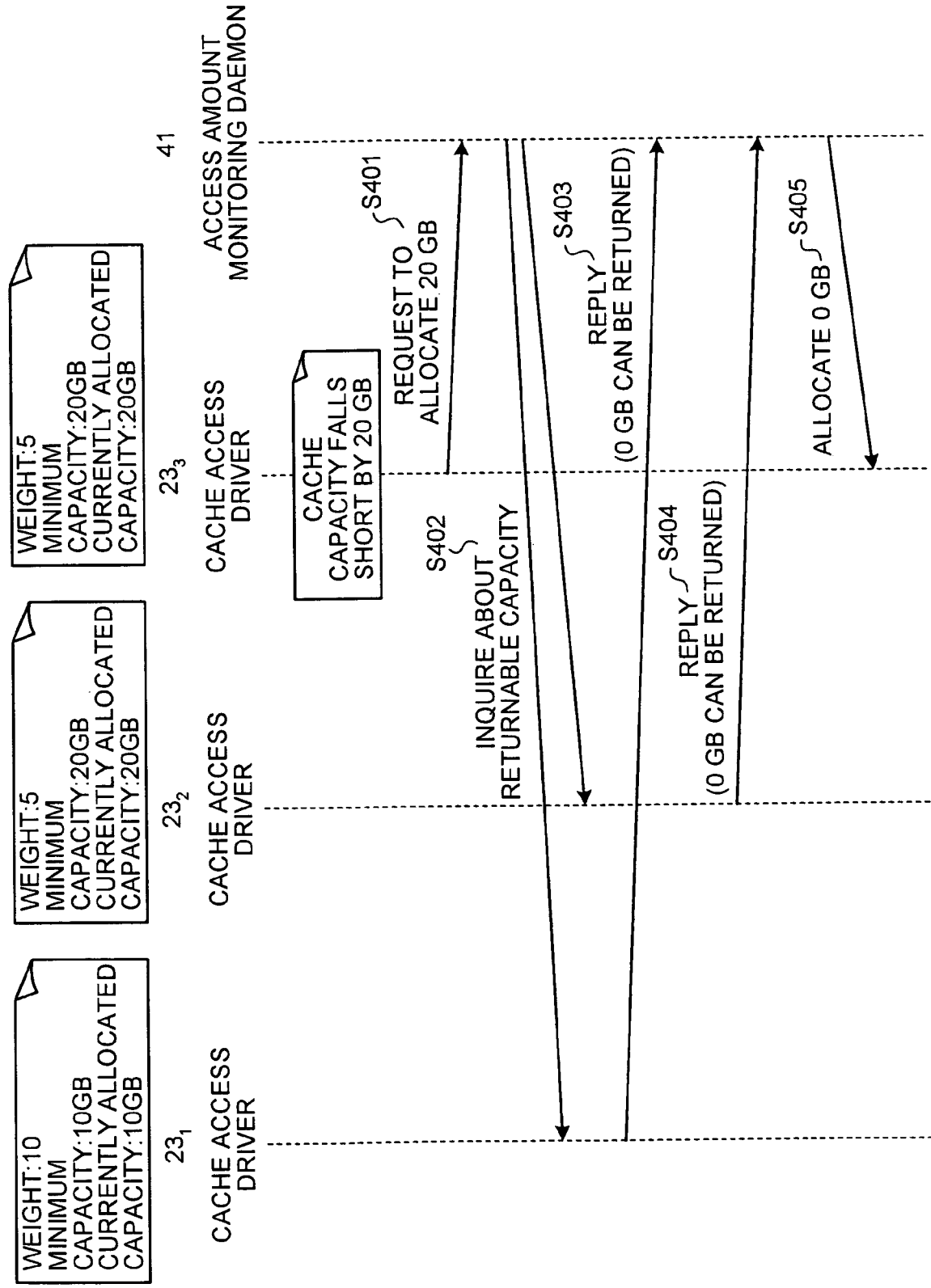
FIG. 9 is a sequence diagram of a process procedure of refusing the cache memory allocation request.

FIG. 8 is a diagram for explaining a concept of refusing a cache memory allocation request in the caching control process, and FIG. 9 is a sequence diagram of a process procedure of refusing the cache memory allocation request. The configuration shown in FIG. 8 is similar to that shown in FIG. 6, and therefore, is not explained.

In the example shown in FIG. 8, the cache access driver $23_3$ determines that the HD managed by the cache access driver $23_3$ falls short of 20 GB of cache memory.

In this case, as shown in FIG. 9, the cache access driver $23_3$ requests the access amount monitoring daemon 41 to allocate a cache memory of 20 GB (step S401).

The access amount monitoring daemon 41 inquires the cache access drivers $23_1$ and $23_2$ about memory that can be returned (step S402). In response to this inquiry, the cache access drivers $23_1$ and $23_2$ notify the returnable capacity of the cache memory (0 GB, and 0 GB, respectively) to the access amount monitoring daemon 41 (step S403, and step S404).

In this case, a weight allocated to the HD managed by the cache access driver $23_3$ is 5, and weights allocated to the HDs managed by the cache access drivers $23_1$ and $23_2$ are 10 and 5, respectively. Therefore, the access amount monitoring daemon 41 can make the cache access driver $23_2$ release the cache memory, but cannot make the cache access driver $23_1$ release the cache memory.

Minimum allocation capacities of the cache memories of the HDs managed by the cache access drivers $23_1$ and $23_2$ are 10 GB and 20 GB, respectively. Currently allocated capacities of the cache memories of the HDs managed by the cache access drivers $23_1$ and $23_2$ are 10 GB and 20 GB, respectively. Therefore, the cache access drivers $23_1$ and $23_2$ cannot return the cache memories.

Thereafter, because there is no returnable cache memory, the access amount monitoring daemon 41 allocates a cache memory of 0 GB to the cache access driver $23_3$ (step S405).

The information of the cache memories allocated is stored into the memories $25_1$ to $25_m$ of the server devices $20_1$ to $20_m$. The cache access drivers $23_1$ to $23_m$ cache the data stored in the HDs $21_1$ to $21_m$, based on the information stored.

As described above, according to the third embodiment, the access amount monitoring daemon 41 compares first weight of the HDs $21_1$ to $21_m$ with second weight of the HDs $21_1$ to $21_m$ respectively. Based on a result of the comparison, the access amount monitoring daemon 41 determines whether the memories $33_1$ to $33_n$ allocated as cache memories to the HDs $21_1$ to $21_m$ with the second weight can be allocated as cache memories to the HDs $21_1$ to $21_m$ with the first weight. The memories $25_1$ to $25_m$ of the server devices $20_1$ to $20_m$ store the information concerning the memories $33_1$ to $33_n$ allocated as cache memories to the HDs $21_1$ to $21_m$ after the determination. Therefore, by setting the weights, it is possible to control allocation of the cache memories to the HDs $21_1$ to $21_m$. Consequently, the caching process can be executed efficiently.

According to the third embodiment, the access amount monitoring daemon 41 releases the memories $33_1$ to $33_n$ allocated as cache memories to the other HDs $21_1$ to $21_m$ installed in the PCs $30_1$ to $30_n$. When the released memories $33_1$ to $33_n$ are allocated as cache memories of the HDs $21_1$ to $21_m$, the access amount monitoring daemon 41 determines whether the capacities of the cache memories of the other HDs $21_1$ to $21_m$ after the release of the memories $33_1$ to $33_n$ are smaller than predetermined minimum values. If the capacities of the cache memories are smaller than the predetermined minimum values, the access amount monitoring daemon 41 stops releasing the memories $33_1$ to $33_n$. Therefore, the minimum values of the cache memories allocated to the HDs $21_1$ to $21_m$ can be controlled. Consequently, the caching process can be executed efficiently.

In the third embodiment, weights allocated to the HDs $21_1$ to $21_m$ managed by the cache access drivers $23_1$ to $23_m$ are fixed. It is also possible to change the weights allocated to the HDs $21_1$ to $21_m$ according to the amount of data transferred to the HDs $21_1$ to $21_m$ per unit time, and then appropriately allocate cache memories by matching with the transfer amount of data.

In a fourth embodiment, the operation of changing weights allocated to the HDs $21_1$ to $21_m$ according to the amount of data transferred to the HDs $21_1$ to $21_m$ per unit time is explained.

Figure 10:
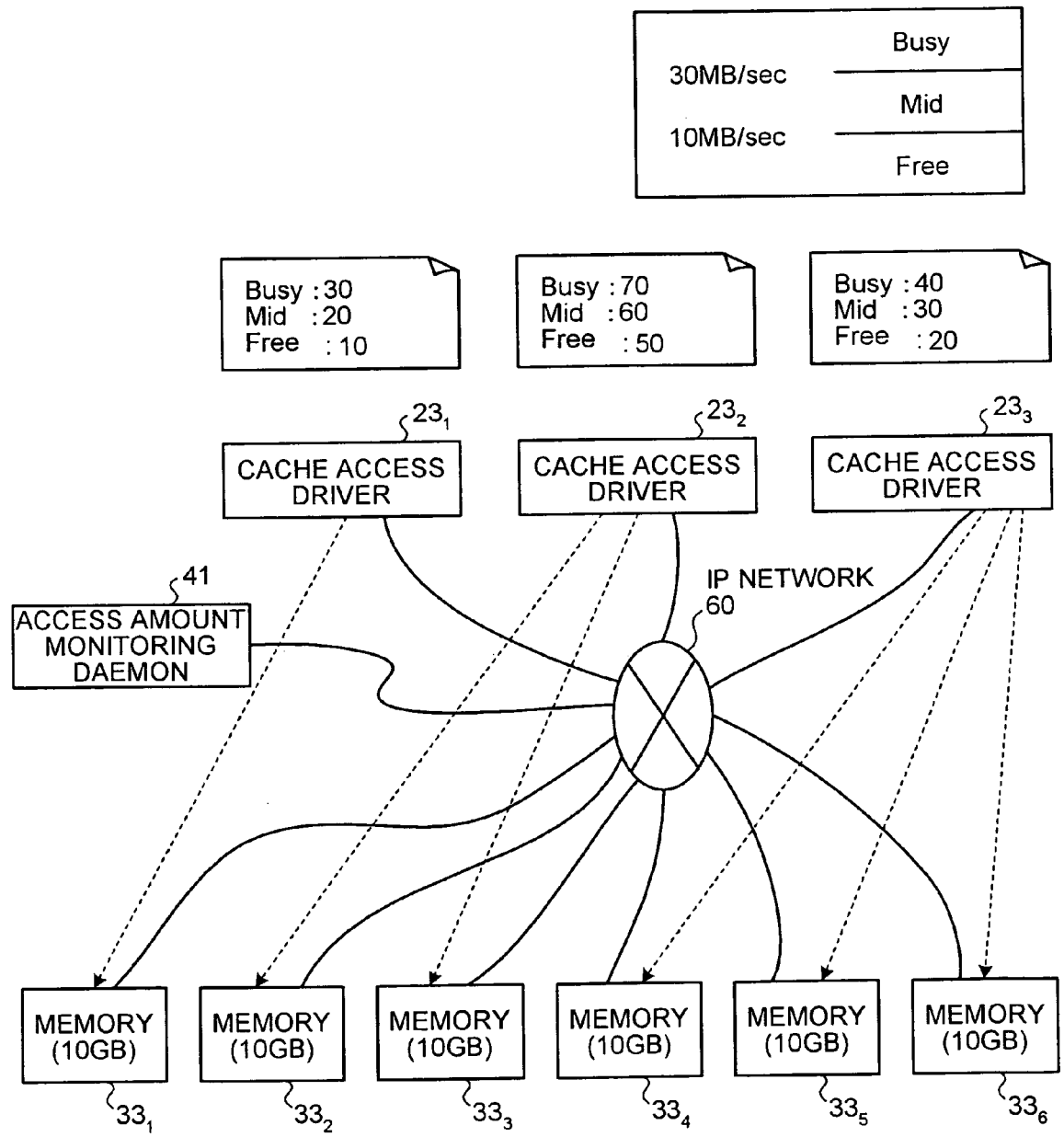
FIG. 10 is a diagram for explaining a concept of a caching control process according to a fourth embodiment.

A process procedure of a caching control process according to the fourth embodiment is explained next. FIG. 10 is a diagram for explaining a concept of the caching control process according to the fourth embodiment.

In FIG. 10, the cache access drivers $23_1$ to $23_3$ included in three server devices use the memories $33_1$ to $33_6$ provided in the six PCs $30_1$ to $30_6$ as cache memories via the IP network 60. Each of the memories $33_1$ to $33_6$ used as cache memories has a capacity of 10 GB.

The access amount monitoring daemon 41 included in the access amount monitoring server device 40 is connected to the IP network 60.

The memory $33_1$ is allocated as a cache memory to the HD managed by the cache access driver $23_1$. The memories $33_2$ and $33_3$ are allocated as cache memories to the HD managed by the cache access driver $23_2$. The memories $33_4$, $33_5$, and $33_6$ are allocated as cache memories to the HD managed by the cache access driver $23_3$.

In this caching control process, three states of the HDs $21_1$ to $21_m$ are defined according to the amount of data transferred to the HDs $21_1$ to $21_m$ per unit time.

Specifically, when the amount of data transfer per unit time is equal to or larger than 30 MB/sec, this state is defined as "busy". When the amount of data transfer per unit time is smaller than 30 MB/sec and equal to or larger than 10 MB/sec, this state is defined as "medium (mid)". When the amount of data transfer per unit time is smaller than 10 MB/sec, this state is defined as "free".

The cache access drivers $23_1$ to $23_3$ monitor the amount of data transferred per unit time in all storage areas of the HDs $21_1$ to $21_m$, and store this monitored information into the memories $25_1$ to $25_m$ of the server devices $20_1$ to $20_m$.

On the other hand, weights that are set corresponding to the states "busy", "mid", and "free" of the HDs $21_1$ to $21_m$, are stored into the memories $25_1$ to $25_m$ of the server devices $20_1$ to $20_m$.

The cache access drivers $23_1$ to $23_3$ determine in which one of the states—"busy", "mid", and "free"—each one of the HDs $21_1$ to $21_m$ is, and set weights of the HDs $21_1$ to $21_m$ corresponding to the determined states.

A large weight assigned to one of the HDs $21_1$ to $21_m$ to which a large amount of data is transferred, indicates a high priority of a cache memory allocation to that HD. Further, a small weight assigned to one of the HDs $21_1$ to $21_m$ to which a small amount of data is transferred, indicates a low priority of a cache memory allocation to that HD.

After the weights are set in this way, caching memories are allocated or released based on the method explained in the third embodiment.

Figure 11:
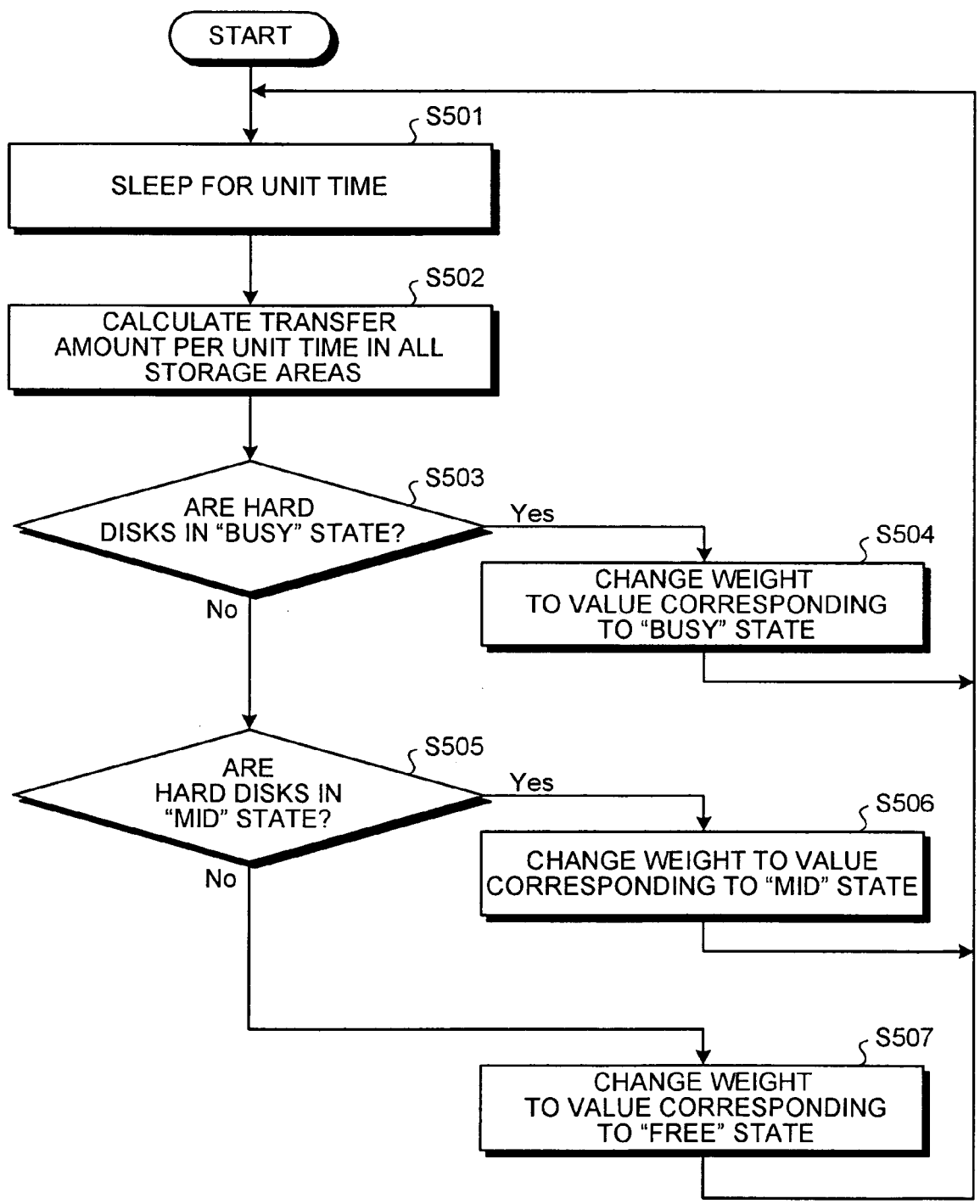
FIG. 11 is a flowchart of a process procedure of the caching control process according to the fourth embodiment.

A process procedure of the caching control process according to the fourth embodiment is explained next. FIG. 11 is a flowchart of the process procedure of the caching control process according to the fourth embodiment.

As shown in FIG. 11, the cache access drivers $23_1$ to $23_m$ of the server devices $20_1$ to $20_m$ sleep and wait for a unit time (step S501). The cache access drivers $23_1$ to $23_m$ calculate a transfer amount to the HDs $21_1$ to $21_m$ per unit time in all storage areas (step S502).

The cache access drivers $23_1$ to $23_m$ check whether the HDs $21_1$ to $21_m$ are in the "busy" state, based on the transfer amount per unit time calculated (step S503). If the HDs $21_1$ to $21_m$ are in the "busy" state (Yes at step S503), the cache access drivers $23_1$ to $23_m$ change the weights to values corresponding to the "busy" state (step S504). Then, the process proceeds to step S501.

If the HDs $21_1$ to $21_m$ are not in the "busy" state (No at step S503), the cache access drivers $23_1$ to $23_m$ check whether the HDs $21_1$ to $21_m$ are in the "mid" state (step S505). If the HDs $21_1$ to $21_m$ are in the "mid" state (Yes at step S505), the cache access drivers $23_1$ to $23_m$ change the weights to values corresponding to the "mid" state (step S506). Then, the process proceeds to step S501.

If the HDs $21_1$ to $21_m$ are not in the "mid" state (No at step S505), the cache access drivers $23_1$ to $23_m$ change the weights to values corresponding to the "free" state (step S507). Then, the process proceeds to step S501.

As described above, according to the fourth embodiment, the cache access drivers $23_1$ to $23_m$ change weights corresponding to the state of access to data stored in the HDs $21_1$ to $21_m$. The cache access drivers $23_1$ to $23_m$ compare first weight of the HDs $21_1$ to $21_m$ with second weight of the HDs $21_1$ to $21_m$ respectively. Based on a result of the comparison, the cache access drivers $23_1$ to $23_m$ determine whether the memories $33_1$ to $33_n$ allocated as cache memories to the HDs $21_1$ to $21_m$ with the second weight should be allocated as cache memories to the HDs $21_1$ to $21_m$ with the first weight. Therefore, a higher priority can be set to the HDs $21_1$ to $21_m$ in which more-frequently accessed data are stored, thereby allocating cache memories to these HDs with high priority. Consequently, the caching process can be executed efficiently.

While the processes according to the embodiments of the present invention are explained above, a computer can also execute these processes using programs prepared in advance. An example of the process executed by a computer using the programs is explained below with reference to FIG. 12.

Figure 12:
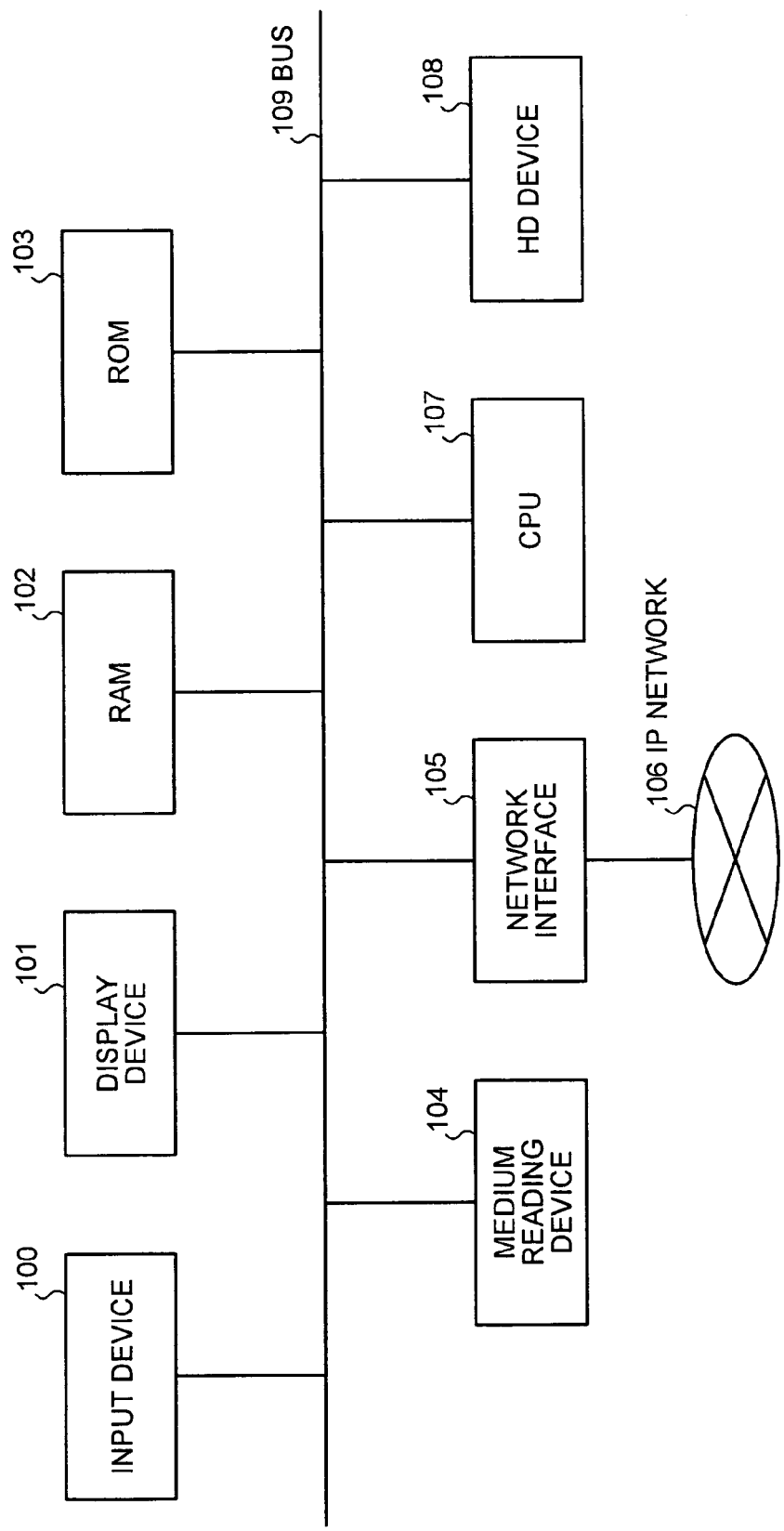
FIG. 12 is a hardware configuration diagram of a computer that achieves the function of various devices shown in FIG. 1.

FIG. 12 is a hardware configuration diagram of a computer that achieves the functions of the various devices shown in FIG. 1. The devices refer to the client devices $10_1$ to $10_l$, the server devices $20_1$ to $20_m$, the PCs $30_1$ to $30_n$, and the access amount monitoring server device 40.

The computer includes an input device 100 that receives data input by a user, a display device 101, a random access memory (RAM) 102, a read only memory (ROM) 103, a medium reading device 104 that reads programs from a recording medium storing these programs, a network interface 105 that exchanges data with other computers via an IP network 106, a central processing unit (CPU) 107, and an HD device 108, all of which are connected via a bus 109.

Programs that achieve the same functions, as those of the above devices, are stored in the HD device 108. The CPU 107 reads the programs from the HD device 108, and executes the programs, thereby achieving the functions of the functional units of the devices shown in FIG. 1.

The above programs are not necessarily stored in the HD device 108 from the beginning. For example, the programs can be stored in advance in a portable physical medium such as a flexible disk (FD), a compact disk read only memory (CD-ROM), a magneto optical (MO) disk, a digital versatile disk (DVD), an optical magnetic disk, and an integrated circuit (IC) card that are inserted into the computer, a fixed physical medium such as a hard disk drive (HDD) provided inside and outside the computer, and another computer (or server) that is connected via a public line, the Internet, a local area network (LAN), or a wide area network (WAN). The computer reads the programs from these devices, and can execute these programs.

While the embodiments of the present invention are explained above, the present invention can be also implemented according to various different modifications of the embodiments within a range of the technical idea described in claims.

While the HDs in the above embodiments are those following the SCSI standard, the HDs in the present invention are not limited to this type, but can be HDs based on other standards such as the Integrated Drive Electronics (IDE).

In this case, the SCSI command transmitted via the IP network using the iSCSI technique is converted into an IDE command at a server device that receives the SCSI command.

Of the respective processes explained in the embodiments, all or a part of the processes performed automatically may be performed manually, or all or a part of the processes performed manually may be performed automatically by a known method.

The information including the process procedure, the control procedure, specific names, and various kinds of data and parameters shown in the specification or in the drawings can be optionally changed, unless otherwise specified.

The respective constituents of the illustrated apparatus are functionally conceptual, and physically identical configuration is not always necessary. In other words, the specific mode of dispersion and integration of the apparatus is not limited to the illustrated one, and all or a part thereof may be functionally or physically dispersed or integrated in an optional unit, according to the various kinds of load and the status of use.

All or an optional part of the various processing functions performed by the apparatus can be realized by the CPU or a program analyzed and executed by the CPU, or can be realized as hardware by wired logic.

According to the present invention, data caching process can be executed efficiently.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that records therein a computer program to control caching of data stored in a storage device, the cache control program including instructions, which when executed, cause the computer to execute:

storing, in a storing unit, information concerning memory allocated to the storage device as its cache memory, wherein the storing unit is installed in a first computer connected to a second computer via a network, the first computer manages reading and writing of data to the storage device, and the second computer includes a memory installed therein;

determining whether an amount of data transfer to the storage device of the first computer within a predetermined time is larger than a predetermined threshold value; and controlling the caching of the data that uses the memory installed in the second computer as cache memory, based on the information stored, wherein the determining includes determining whether a first amount of data transfer to the storage device of the first computer during a first period and a second amount of data transfer to the storage device of the first computer during a second period are larger than the predetermined threshold value, and the controlling includes deciding whether the data should be stored into the memory installed in the second computer, based on a result of the determining, and deleting the data stored in the memory installed in the second computer when the data has been stored in the memory of the second computer and it is determined at the determining that both of the first amount and the second amount of the data transfer to the storage device of the first computer are smaller than the predetermined threshold value.

2. The recording medium according to claim 1, wherein the controlling includes storing the data into the memory installed in the second computer, when it is determined at the determining that the first amount of data transfer or the second amount of data transfer is larger than the predetermined threshold value.

3. The recording medium according to claim 1, wherein the program further makes the computer execute:

comparing a first priority of allocation of cache memory to the storage device as a first storage device with a second priority of allocation of cache memory to another storage device, deciding whether the memory allocated as cache memory to the another storage device should be allocated as cache memory to the first storage device based on a result of the comparing, and wherein the storing includes storing, after the deciding, the information concerning the memory allocated as the cache memory of the first storage device.

4. The recording medium according to claim 3, wherein the deciding includes releasing the memory allocated as the cache memory of the another storage device installed in the second computer, judging whether the capacity of the cache memory of the another storage device, after the memory release, becomes smaller than a predetermined minimum value, at the time of allocating the released memory as the cache memory to the first storage device, and stopping the release of the memory if the capacity of the cache memory becomes smaller than the predetermined minimum value.

5. The recording medium according to claim 3, wherein the program further makes the computer execute:

changing the priority according to a state of access to the data stored in the storage device, and wherein the comparing and the deciding is performed based on the priority changed.

6. A caching control device that controls caching of data stored in a storage device, comprising:

a storing unit that stores information concerning memory allocated to the storage device as its cache memory, wherein the storing unit is installed in a first computer connected to a second computer via a network, the first computer manages reading and writing of data to the storage device, and the second computer includes a memory installed therein;

a determining unit that determines whether an amount of data transfer to the storage device of the first computer within a predetermined time is larger than a predetermined threshold value; and a controller that controls the caching of the data that uses the memory installed in the second computer as cache memory, based on the information stored in the storing unit, wherein the determining unit further determines whether a first amount of data transfer to the storage device of the first computer during a first period and a second amount of data transfer to the storage device of the first computer during a second period are larger than the predetermined threshold value, and the controller decides whether the data should be stored into the memory installed in the second computer, based on a result determined by the determining unit, and deletes the data stored in the memory installed in the second computer when the data has been stored in the memory of the second computer and it is determined by the determining unit that both of the first amount and the second amount of the data transfer to the storage device of the first computer are smaller than the predetermined threshold value.

7. A method to control caching of data stored in a storage device, comprising:

storing, in a storing unit, information concerning memory allocated to the storage device as its cache memory, wherein the storing unit is installed in a first computer connected to a second computer via a network, the first computer manages reading and writing of data to the storage device, and the second computer includes a memory installed therein;

determining whether an amount of data transfer to the storage device of the first computer within a predetermined time is larger than a predetermined threshold value; and controlling the caching of the data that uses the memory installed in the second computer as cache memory, based on the information stored, wherein the determining includes determining whether a first amount of data transfer to the storage device of the first computer during a first period and a second amount of data transfer to the storage device of the first computer during a second period are larger than the predetermined threshold value, and the controlling includes deciding whether the data should be stored into the memory installed in the second computer, based on a result of the determining, and deleting the data stored in the memory installed in the second computer when the data has been stored in the memory of the second computer and it is determined at the determining that both of the first amount and the second amount of the data transfer to the storage device of the first computer are smaller than the predetermined threshold value.

8. A method, comprising:

storing data in a storage unit of a first computer;

using a memory of a second computer as a cache memory for the data;

determining whether a first amount of data transfer to the storage unit of the first computer during a first period and a second amount of data transfer to the storage unit of the first computer during a second period are larger than a predetermined threshold value;

deciding whether the data should be stored into the memory installed in the second computer, based on a result of the determining; and deleting the data in the memory of the second computer when the data has been stored in the memory of the second computer and it is determined that both of the first amount and the second amount of the data transfer to the storage unit of the first computer are smaller than the predetermined threshold value.

9. A system, comprising:

a first computer having a storage unit storing data;

a network connected to the first computer;

a second computer connected to the network and comprising a cache memory caching the data of the storage unit;

a determining unit that determines whether a first amount of data transfer to the storage unit of the first computer during a first period and a second amount of data transfer to the storage unit of the first computer during a second period are larger than a predetermined threshold value; and a controller that decides whether the data should be stored into the cache memory of the second computer, based on a result determined by the determining unit, and deletes the data in the memory of the second computer when the data has been stored in the memory of the second computer and it is determined that both of the first amount and the second amount of the data transfer to the storage unit of the first computer are smaller than the predetermined threshold value.

* * * * *